United States Patent [19]

Jeong

[11] Patent Number: 5,475,433
[45] Date of Patent: Dec. 12, 1995

[54] FUZZY-CONTROLLED CODING METHOD AND APPARATUS THEREFOR

[75] Inventor: Je-chang Jeong, Seoul, Rep. of Korea

[73] Assignee: Samsung Electronics Co., Ltd., Kyungki-Do, Rep. of Korea

[21] Appl. No.: 228,553

[22] Filed: Apr. 15, 1994

[30] Foreign Application Priority Data

Apr. 15, 1993 [KR] Rep. of Korea .......... 93-6313

[51] Int. Cl.⁶ .................................................. H04N 7/32
[52] U.S. Cl. ............................................ 348/419; 348/405
[58] Field of Search ...................... 348/405, 419, 348/231; H04N 7/133

[56] References Cited

U.S. PATENT DOCUMENTS 5,038,209  8/1991  Hang ......................... 348/419
5,077,798  12/1991  Ichikawa et al. ........... 381/36
5,295,077  3/1994  Fukuoka ..................... 348/231
5,367,335  11/1994  Murakami et al. .......... 348/405

FOREIGN PATENT DOCUMENTS

63-76687  4/1988  Japan ........................ H04N 7/133

Primary Examiner—Tommy P. Chin
Assistant Examiner—A. Au
Attorney, Agent, or Firm—Sughrue, Mion, Zinn, Macpeak & Seas

[57] ABSTRACT

A fuzzy-controlled coding method and apparatus thereof wherein quantization step size which is determined by values of image complexity, buffer fullness, motion vector and picture brightness, is controlled by using a fuzzy reasoning and defuzzification, enables properly dealing with the case where the conditions which influence a quantization step size deviate from the conventional algorithm established in a system. As a result, the image restored by decoding has a stable image quality.

13 Claims, 5 Drawing Sheets

FUZZY-CONTROLLED CODING METHOD AND APPARATUS THEREFOR

BACKGROUND OF THE INVENTION

The present invention relates to a fuzzy-controlled coding method and apparatus therefor, and more particularly, to a coding method and apparatus therefor for controlling a quantization step size which is determined by a state of a buffer for storing coded image data and a visual characteristic of the human eye, using a fuzzy control method.

Known methods are currently widely used in audio and/or video transceiving systems for digitally encoding an image video signal and/or audio signal into a digital signal, transmitting or recording the result, and decoding the received signal or the reproduced signal. In general, such methods include a transform coding method, a differential pulse code modulation method, a vector quantization method, and a variable length coding method. The kinds of methods commonly used operate to reduce the total data amount by removing redundant data from a digital image signal.

To perform the above-described coding methods, a screen is divided into predetermined-sized blocks. Then, transform operations are performed on each block or a difference signal between each block is generated, and the image data is converted into a transform coefficient in the frequency domain. Data transform methods for respective blocks include a discrete cosine transform (DCT) which is the most widely used, a Walsh-Hadamard transform (WHT) operation, a discrete Fourier transform (DFT) and a discrete sine transform (DST) operation.

When signal strength is concentrated into the low frequency domain, resulting from the above described-transform methods, transform coefficients are changed into representative values through a quantization process. Then, the representative values are variable-length-coded, considering the static characteristics of the representative values, to thereby compress the data.

However, the human eye is more sensitive to lower frequencies than to a higher frequencies. Therefore, the amount of transferred data can be further decreased by making the compression rate of image data in the high frequency domain relatively larger than that in the low frequency domain.

Figure 1:
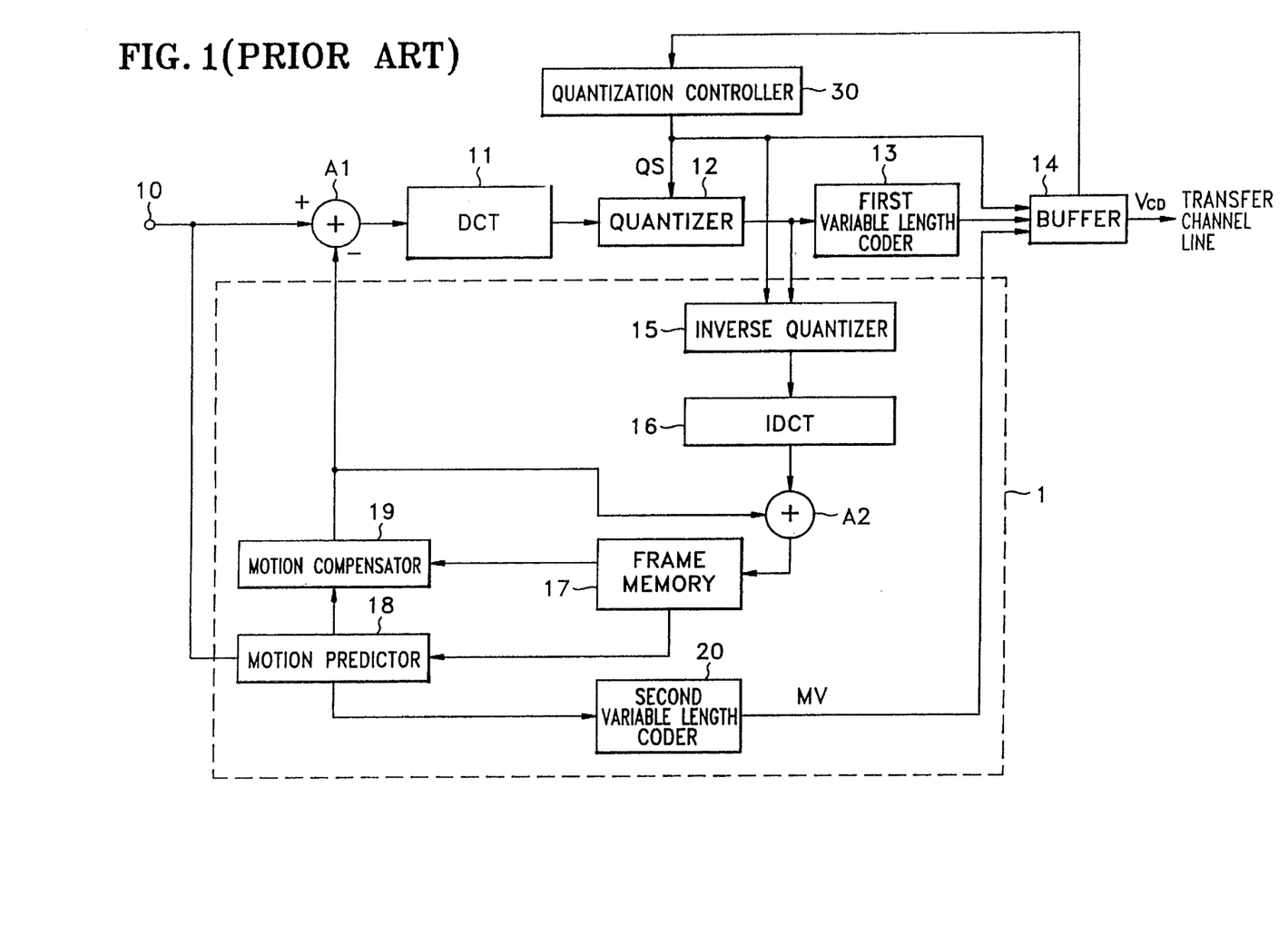
FIG. 1 is a block diagram showing a conventional image coder.

FIG. 1 is a schematic block diagram showing a conventional coding apparatus for a motion picture image.

Referring to FIG. 1, a block image data of N×N size (a reference block data) is applied to an input terminal 10. (Generally, an N1×N2 sized block is applied. However, it is assumed here that N1=N2.) Predetermined feedback data is applied to the "−" input terminal of a first adder A1 to be subtracted from the block image data which is applied to "+" input terminal in first adder A1. The result of the subtraction (the difference data) is applied to a discrete cosine transformer 11. In discrete cosine transformer 11, the difference data is converted into transform coefficients, namely, frequency domain data. The signal strength of the transform coefficients will be concentrated into the lower frequencies.

The output of DCT 11 is applied to a quantizer 12, where the transform coefficients are changed into representative values of regular level through a predetermined quantization process. That is, a quantization step size (QS) parameter which is output from a quantization controller 30 is provided to quantizer 12 to control the quantization of the transform coefficients depending on the data storing state of a buffer 14.

In quantization controller 30, the quantization step size (QS) is controlled so that an overflow or underflow of data will not occur in buffer 14, to thereby control the bit rate. The quantized data from quantization controller 30 is applied to a variable length coder 13, where the quantized data is compressed by performing a variable length coding operation on the quantized transform coefficients, considering the static characteristics of the quantized transform coefficients.

Typically, a variable length coder such as coder 13 uses Huffman coding or arithmetic coding. In the Huffman coding method, considering the probability distribution of a symbol of the input signal, a symbol having a high probability, i.e., a symbol whose generation rate is high, is converted into a short code, while a symbol having a low probability is converted into a long code. However, when there are many kinds of symbols and most of the symbols have extremely low probabilities, long code words are given to each low probability symbol by a Huffman coding algorithm. As a result, both the encoding and decoding become very complicated.

Figure 2:
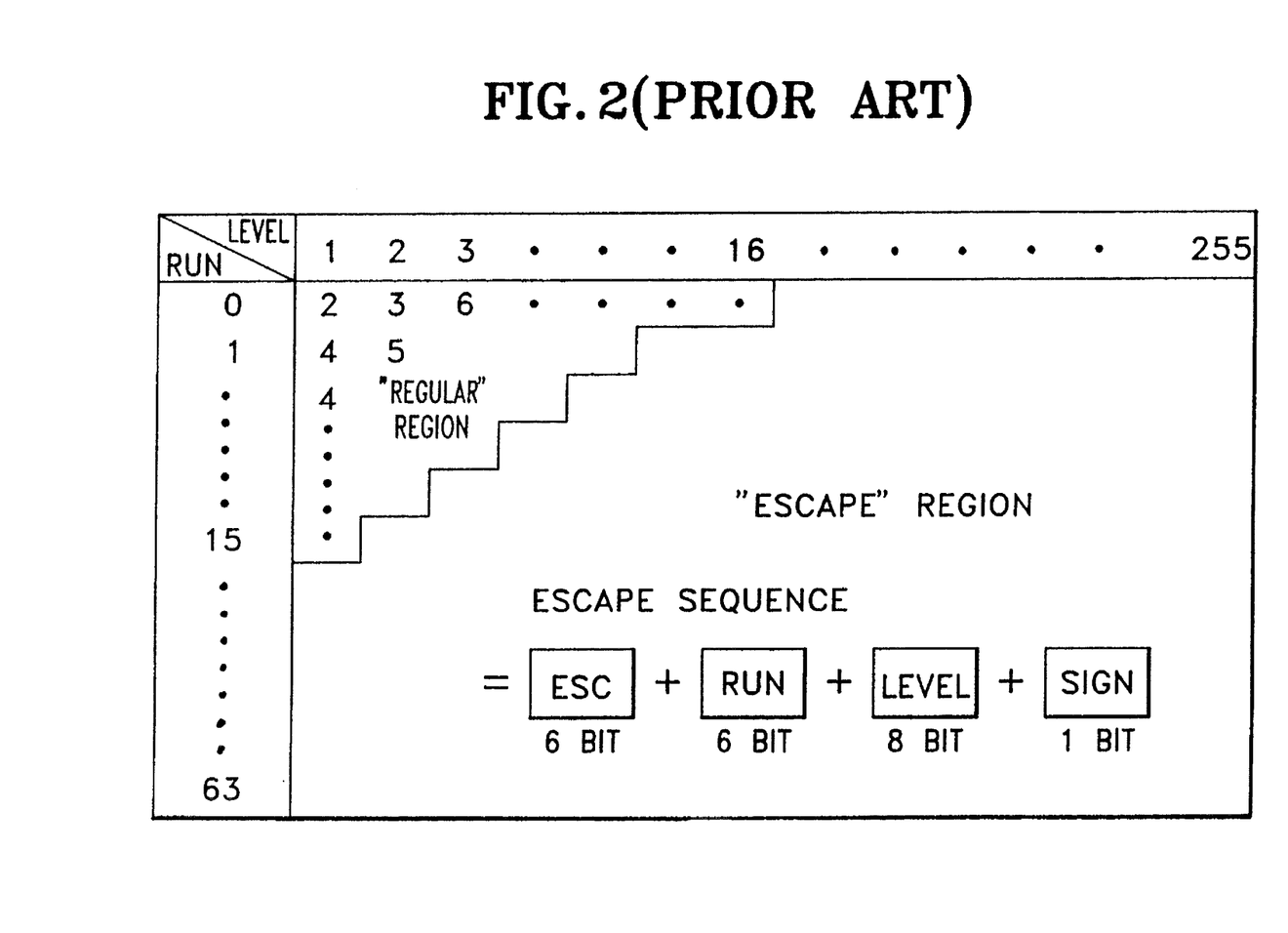
FIG. 2 illustrates a code length when Huffman coding is performed in the variable length coder shown in FIG. 1.

To overcome this problem, as shown in FIG. 2, the low probability symbols are grouped into one so as to be treated as a simple fixed length code like an escape sequence. Thus, the average code length increases a little more than the original Huffman code. As a result, efficiency is lowered but the complexity decreases greatly.

In an image signal coding process, after a transform coefficient is quantized, a run length coding is performed by scanning up to the highest frequency component according to a zigzag scan starting from a low frequency component, having noticed that most of the quantized coefficients are 0. The run length code can be represented as (RUN, LEVEL). Here, RUN is the number of 0's between the non-zero coefficients, and the non-zero level varies depending on the number of values possibly coming out of the quantization operation, for example, when the output of the quantization ranges from integers −255 to +225, LEVEL takes values of 1 to 255, and a negative level is expressed using a sign bit.

When (RUN, LEVEL) is regarded as a single symbol, if RUN or LEVEL is high, an escape sequence consists of 6 bits (for example) of escape code, 6 bits for expressing RUN (0–63), 8 bits for expressing LEVEL (1–255) and 1 bit for expressing sign, thus 21 bits (for example) in total, in an escape area having a statistically low generation rate of the symbol. Other methods than the escape sequence can be also used depending upon the employed system.

In buffer 14, compressed data irregularly output from variable length coder 13 is input and stored. A data storing state, i.e., a buffer fullness (BF) signal, is output from the first variable length encoder 13 in order to control the amount of data input and to prevent an overflow or an underflow in buffer 14. Data from the buffer is output at a regular speed to the transfer channel line.

Meanwhile, as a result of compressing the image data, the image motion occurring between successive image frames as well as the relation of the spatial domain of an image within a single frame is detected. The amount of data to be transferred or to be recorded is reduced according to the detected degree of motion. Generally, since there are a lot of similar points between successive images, the degree of motion is estimated by employing reference block or macro block units, to thereby calculate a motion vector (MV). When the image data is compensated using the motion vector, the transfer data can be further compressed since the difference signal derived between the successive images is extremely small.

During processing of an image frame which is performed by coding using only the relation of the spatial domain of an image in a frame, i.e., when an intraframe is processed, data of an intraframe is stored into a frame memory 17 of a local decoder 1 so as to be employed for detecting the relative motion of the next frame.

Local decoder 1 is explained in more detail in the following paragraphs.

In an inverse quantizer 15, data of the intraframe output from quantizer 12 is inversely quantized. Then, the result is inversely converted in an inverse discrete cosine transformer 16 and is converted into image data in the spatial domain.

In a motion predictor 18, data of the current frame which is processed as an interframe, i.e., a frame which uses the relation of adjacent frames, and data of the previous frame stored in frame memory 17, are input so as to detect the motion between the two frames.

A block matching method performed by a full search is used for detecting the motion in motion predictor 18. In the block matching method, a block which is most similar to a reference block is searched for within a limited search area, laying stress on a block of the previous frame located in the same location with that of the given N×N block (reference block) of the current frame. At this time, various criteria may be chosen for determining the degree of similarity. However, an estimated block is generally searched for by determining a mean absolute error (MAE).

Many candidate blocks within a search window are compared with the reference block, and the block having the most similarity is selected as the estimated block. A motion vector is the distance in coordinates that the estimated block moves relative to the reference block.

In a motion compensator 19, the block (an estimated block) which is most similar to the current reference block stored in frame memory 17 is extracted corresponding to the detected motion vector, and is output as a feedback signal applied to the "−" input of first adder (A1). In first adder (A1), estimated error data, i.e., the difference between the block data of the current frame and the feedback signal (the estimated block data moved by the degree of the motion vector in the search window) is derived and is discrete cosine transformed in discrete cosine transformer 11 and is coded and is transferred to the receiver.

Here, considering the structure of a frame, a result of motion compensator 19 is re-stored into frame memory 17 via a second adder (A2) so that interframe processing can be repeated.

A frame unit or a block unit refresh is needed for the output of motion compensator 19 accumulated error.

The motion vector (MV), produced by the motion predictor 18, is also variable-length-coded in a second variable length coder 20 and is transferred to the receiver together with the image signal which is coded into an additional information form so as to be usable by a decoding system.

In the conventional encoder described above, the quantization step size of the quantizer is determined by the amount of data stored in the buffer.

In addition to the above described method, U.S. Pat. No. 5,038,209 discloses a video encoder for determining a quantization step size using the complexity and simplicity of a picture and the data storing state of a buffer.

A data encoding method using quantization is a non-restoring coding method where the restored data does not precisely accord with the data before coding. Therefore, the quantization step size of a quantizer is an important factor affecting the quality of the restored image.

However, in the conventional methods, an algorithm for determining the quantization step size of the quantizer using the various factors which greatly affect the image quality is complicated and is very difficult to implement. Accordingly, a system using data encoding having a high compression rate like HD-TV may have an unstable image quality in the restored image.

U.S. Pat. No. 5,077,798 discloses a voice coding method and system for providing reproduced high quality voice despite using a high data compression rate. The system of the latter patent uses a fuzzy control technique and is based on vector quantization. The system expresses the distance between the code vector nearest an input voice and the adjacent vector as a membership function, and the aural signal is vector-quantized. However, a method for determining the quantization step size by a fuzzy control method in a scalar quantization, as a method of the present invention which will be described hereinafter, is not heretofore disclosed.

SUMMARY OF THE INVENTION

It is an object of the present invention to provide a fuzzy-controlled coding method which can stabilize the screen quality of the restored picture even at a high compression rate, by means of determining a quantization step size according to a fuzzy control methodology using such information as the degree of data filling of a buffer, complexity and simplicity of a block, brightness of a block and a motion vector.

It is another object of the present invention to provide a fuzzy-controlled coding apparatus wherein the above method is embodied.

To accomplish the objects of the present invention, there is provided a fuzzy-controlled coding method for quantizing using a quantization step size determined by at least one factor among the factors of image complexity(FA), buffer fullness, motion vector and brightness of a picture, the method comprising the steps of:

establishing fuzzy control regulations having at least one input variable thereof selected from the factors of image complexity(FA), buffer fullness, motion vector and the brightness of a picture, and having a quantization step size as an output variable thereof;

determining linguistic truth values related to the respective input variables and a first membership function which corresponds to each linguistic truth value;

calculating a membership grade using the first membership function which corresponds to the input variable and to the linguistic truth value;

generating a second membership function in accordance with a predetermined reasoning operation, using the calculated membership grade, the linguistic truth value used for calculating the membership grade and the established fuzzy control regulations; and determining a quantization step size in accordance with the second membership function, using a predetermined defuzzifying operation.

To accomplish another object of the present invention, there is provided a fuzzy controlled coding apparatus having a quantizer for controlling a quantization according to a quantization step size determined by at least one data variable among the data variables respectively representing image complexity(FA), buffer fullness, picture brightness and a motion vector, said apparatus comprising:

means for storing fuzzy control regulations by which may be determined a quantization step size using the said data;

fuzzifier means for storing a linguistic truth value related to each said data variable and a first membership function which corresponds to each said linguistic truth value, and for generating a membership grade and the corresponding linguistic truth value, from at least one of said data variables with respect to a predetermined block unit of an image to be quantized;

fuzzy reasoning means for reading the fuzzy control regulations determined by the membership grade and the corresponding linguistic truth value from the regulation storage means, and for generating a second membership function by reasoning the membership grade output from the fuzzifier means and the corresponding linguistic truth value according to a predetermined operation; and defuzzifier means for defuzzifying the second membership function generated by the fuzzy reasoning means according to a predetermined defuzzifying operation, and for generating a quantization step size in accordance therewith.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

A fuzzy-controlled coding method and apparatus thereof according to the present invention will be explained with reference to the attached drawings.

Figure 3:
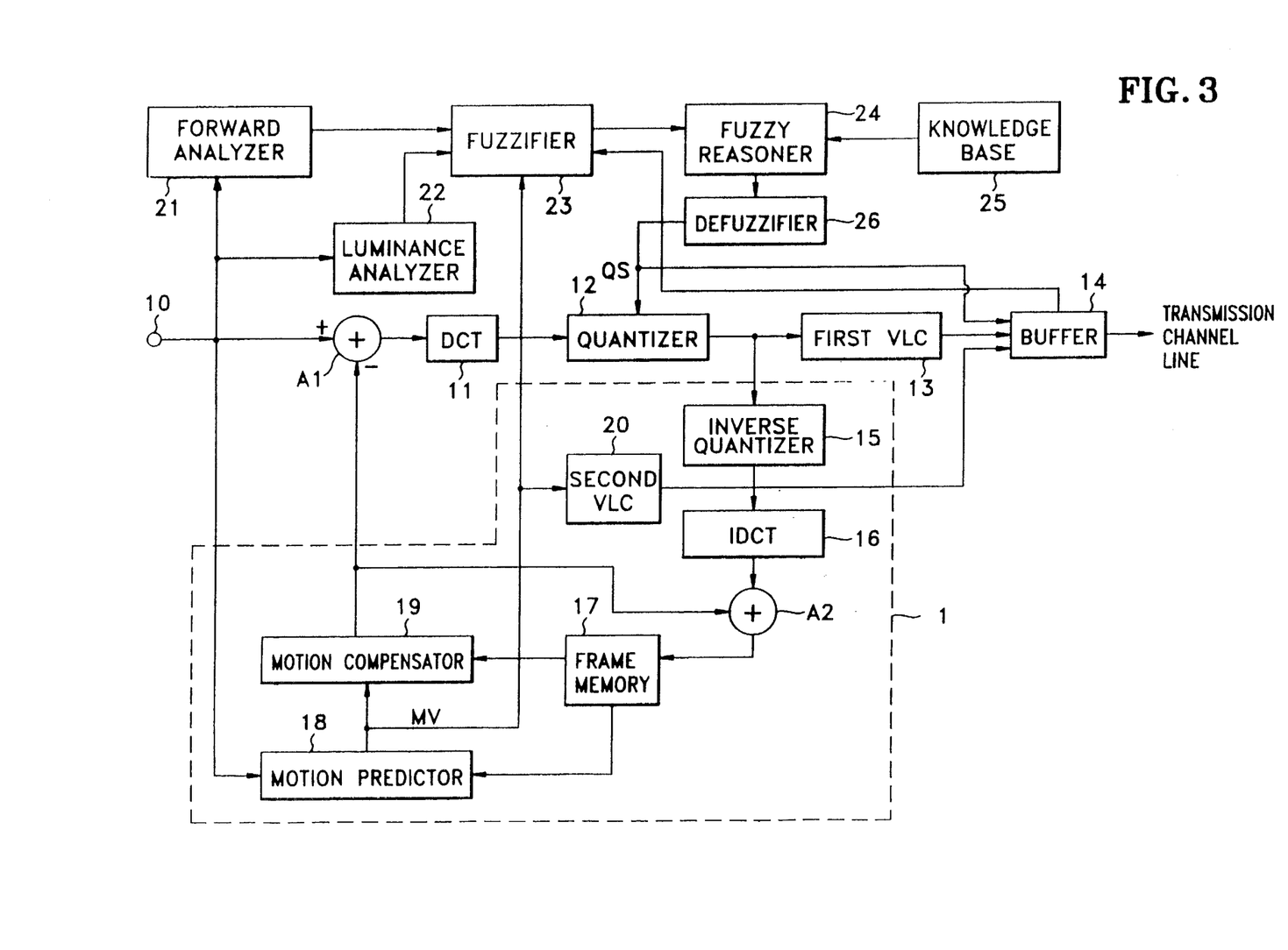
FIG. 3 is a block diagram showing an embodiment of a fuzzy-controlled coder according to the present invention.

In FIG. 3, which is a block diagram showing an embodiment of a fuzzy controlled coder according to the present invention, elements which are identical with elements of the prior art FIG. 1 are identified with like numerals.

Being compared with the conventional image coder of FIG. 1, the coder of FIG. 3 further includes a forward analyzer 21 connected to an input terminal 10 and which discriminates the degree of image complexity(FA) of an image signal input thereto by N×N block (reference block) units, and a luminance analyzer 22 for detecting the brightness of the image by reference block units, a fuzzifier 23 which is connected to an output terminal of buffer 14, forward analyzer 21, luminance analyzer 22 and a motion predictor 18 and is supplied with input information of buffer fullness, image complexity, brightness and motion vector so as to fuzzify the above input information, a knowledge base 25 which stores predetermined fuzzy control regulations, a fuzzy reasoner 24 which is connected to output terminals of each of fuzzifier 23 and knowledge base 25 and performs reasoning using the fuzzy control regulations, a defuzzifier 26 which is connected to an output terminal of fuzzy reasoner 24 and generates a quantization step size using a center of gravity (COG) method.

Components in FIG. 3 which are the same as those in FIG. 1 are numbered the same as those of FIG. 1, and explanations on the construction and detailed operation thereof will be omitted.

As is generally known in the art, fuzzy theory is employed to treat the "fuzziness" characterizing an intellectual discrimination on which a numerical formulation or a complicated algorithm cannot operate. That is, fuzzy theory is a methodology for quantizing imprecise or "fuzzy" information and for then making such information calculable by a conventional calculating method. In fuzzy theory, a suitable real number between 0 and 1 is selected as a truth value instead of determining the truth value as an absolute binary logic value of 1 or 0 as in Boolean logic.

A multitude of fuzzy sets are created by using the possible scope of an input variable value as a total set, and the degree to which a predetermined input variable is included within a specific fuzzy set is expressed by a real number value between 0 and 1.

Each fuzzy set has membership functions representing the set, and each use a membership grade in order to represent the degree that a specific fuzzy group includes a predetermined input variable. The relationship between a membership function and a membership grade with respect to a predetermined input variable will be explained in more detail with reference to FIG. 4A to FIG. 4E.

Referring to FIG. 3, when the image data of a reference block unit is input to motion predictor 18 through input terminal 10, motion predictor 18 searches for the data which is most similar to the block data of the current frame in memory 17, and generates a motion vector (MV). The motion vector is then transferred to fuzzifier 23 and to second variable length coder 20. In second variable length coder 20, the motion vector is variable-length-coded and transferred to buffer 14. In first variable length coder 13, in the case of an intraframe, block data of the current frame is variable-length-coded, in the case of an interframe, estimation data representative of the difference between the estimation block data and a block data of the current frame is variable-length-coded, and then, the variable-length-coded data is transferred to buffer 14.

Meanwhile, in forward analyzer 21, image data input via input terminal 10 is analyzed by reference block units. Analysis of the image data can be performed in the spatial domain or in the frequency domain or in both domains.

Due to the vision characteristics of a human beings, quantization noise is more noticeable when the image complexity(FA) of a block approaches closer to a simple picture image or to an edge picture image than in a normal picture image. Therefore, the quantization step size is reduced with respect to the simple picture image or the edge picture image in order to reduce the quantization noise.

Since a noise block appearing near a complex image is not so noticeable, the quantization step size is made large. The quantization step size is generally determined in macro block units larger than an N×N block. Therefore, in forward analyzer 21, the image data is analyzed into N×N block units so as to determine the fine quantization step size, and then image complexity(FA) is determined.

In addition, since quantization noise is perceived differently depending on the brightness of an image, in luminance analyzer 22, the brightness of the picture image is detected in each reference block unit of the input image signal and is output to fuzzifier 23.

In fuzzifier 23, the four input variable values, i.e., an image complexity (FA) value output from forward analyzer 21, a brightness (BR) value output from luminance analyzer 22, a motion vector (MV) value output from motion predictor 18 and a buffer fullness (BF) value output from buffer 14, are firstly fuzzified. Then, membership functions corresponding to each input variable value are determined using a lookup table of fuzzifier 23.

There are membership functions used for fuzzification, such as a triangle type, a bell type and a singleton type.

FIGS. 4A to 4E illustrate a fuzzy set, i.e., linguistic truth values, of the input/output variables used for determining the quantization step size. Each triangle whose height is "1" represents a membership function determined by the respective linguistic truth values, and the vertical axis represents the membership grade of each membership function corresponding to the predetermined variable values along the horizontal axis.

Figure 4A:
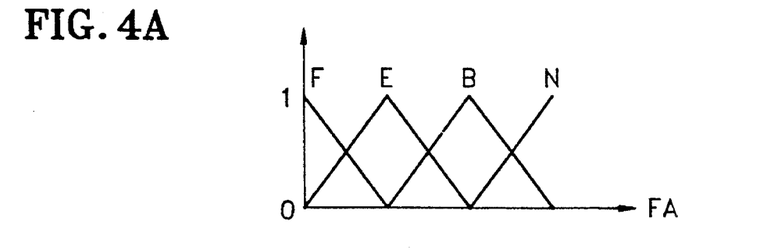
FIG. 4A to FIG. 4E illustrate linguistic truth values of the input/output variables used for determining a quantization step size according to the present invention, and also illustrate the membership functions of each linguistic truth value.

In an embodiment of the present invention, as shown in FIG. 4A, image complexity (FA) is divided into four linguistic truth values, i.e., flat (F), edge (E), busy (B) and normal (N).

Figure 4B:
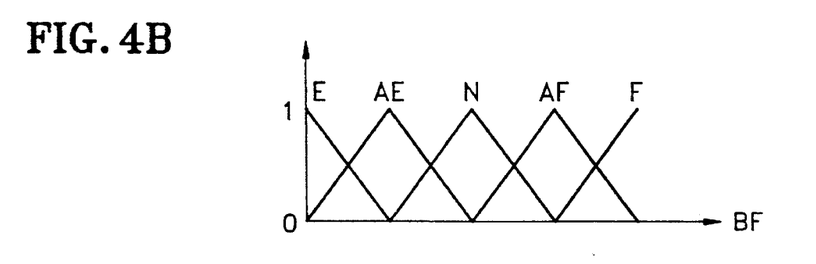

Further, buffer fullness (BF) can be divided into five linguistic values (also called "level"), as shown in FIG. 4B. That is, the linguistic truth values are full (F), almost full (AF), normal (N), almost empty (AE) and empty (E).

Figure 4C:
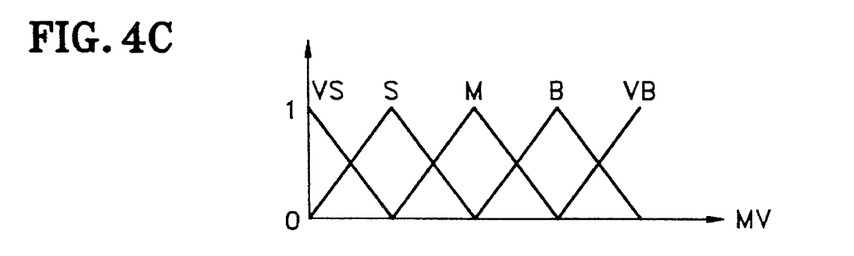

As shown in FIG. 4C, motion vector (MV) has five linguistic truth values, i.e., very big (VB), big (B), medium (M), small (S) and very small (VS).

Figure 4D:
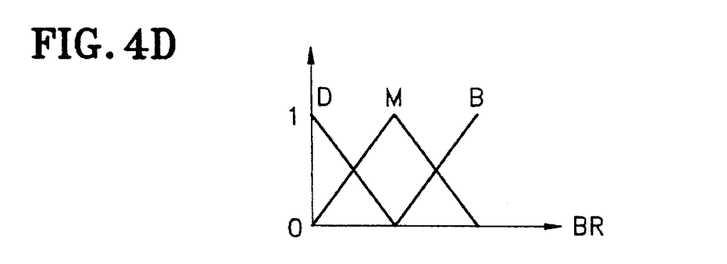

Image brightness (BR) has bright (B), medium (M) and dark (D) as linguistic truth values, as shown in FIG. 4D.

Here, the linguistic truth values of each input variable (FA, BF, MV, BR) have membership grades indicated by the real numbers from 0 to 1.

For example, variable BR in FIG. 4D has a fuzzy group of "dark (M)", "medium (M)" and "bright (B)", and a membership grade of fuzzy group "D" is 0.2 and a membership grade of fuzzy group "M" is 0.8.

Figure 4E:
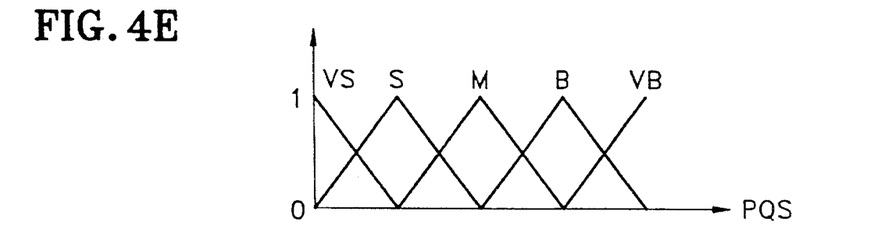

Meanwhile, FIG. 4E illustrates a membership function of a pseudo quantization step size (PQS), where input variables FA, BF, MV and BR are input and from which the PQS function is output finally to control the quantization step size of quantizer 13. The PQS function has five truth values, i.e., very big (VB), big (B), medium (M), small (S) and very small (VS).

As a result, fuzzifier 23 stores membership functions corresponding to the linguistic truth values shown in FIG. 4A to FIG. 4D, and fuzzifies the input variables into triangle membership functions having narrow widths as shown in FIGS. 5A, 5B, 5D, 5E and 5F.

In fuzzifier 23, when the input variables are fuzzified, the point where a narrow width triangle membership function, i.e., a membership function of the fuzzified input variable, and a membership function corresponding to a linguistic truth value meet, is determined as the membership grade for each input variable.

That is, a membership grade determined by a predetermined input variable and the corresponding linguistic truth value are determined by the maximum membership grade of the membership grades determined by the points where the narrow width triangle and the membership function corresponding to a linguistic truth value intersect. Then, the result is transferred to fuzzy reasoner 24.

In fuzzy reasoner 24, fuzzy control regulations related to a predetermined input variable input thereto by fuzzifier 23 and to a corresponding linguistic truth value are read from knowledge base 25 so as to perform a reasoning operation thereupon.

Here, the fuzzy control regulations stored in knowledge base 25 are based upon rules of relation determined through experience and human reasoning.

For example, if the input variables are X and Y, and the output variable is Z, the fuzzy control regulations can be expressed as follows.

Regulation 1: If X is A1 and Y is B1, then Z is C1.

Regulation 2: If X is A2 and Y is B2, then Z is C2.

A process for performing a reasoning operation using input variables and fuzzy control regulations in fuzzy reasoner 24 will be explained with reference to FIG. 5A to FIG. 5H.

FIG. 5A to FIG. 5H illustrate a reasoning using Mamdani's Max-Min method and a defuzzification using a center of gravity method. The control regulations used for fuzzy reasoning are as follows.

Regulation 3: if BF is almost empty (AE) and MV is medium (M), PQS is small (S).

Regulation 4: If image complexity (FA) is flat (F) and MV is small (S) and BF is empty (E), then PQS is very small.

When the regulations related to membership grade and to linguistic truth value are read from knowledge base 25 by fuzzy reasoner 24, the reasoning operation is performed as follows.

Figure 5A:
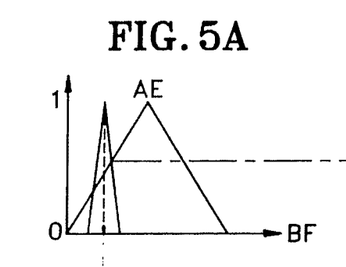
FIG. 5A to FIG. 5H illustrate fuzzy reasoning and defuzzifying performed in a fuzzy reasoning portion and a defuzzifying portion shown in FIG. 3.
Figure 5B:
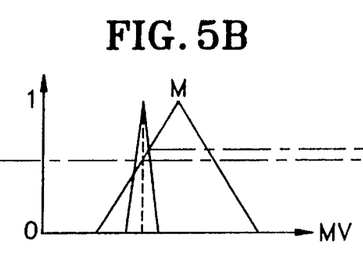
Figure 5C:
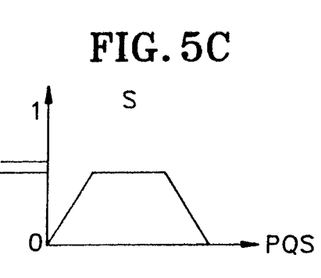

When regulation 3 is applied, if BF has the almost empty (AE) membership function as shown in FIG. 5A, and MV has the medium (M) membership function as shown in FIG. 5B, then PQS has the small sized (S) linguistic truth value as shown in FIG. 5C.

Figure 5D:
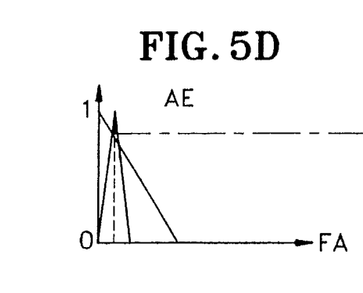
Figure 5E:
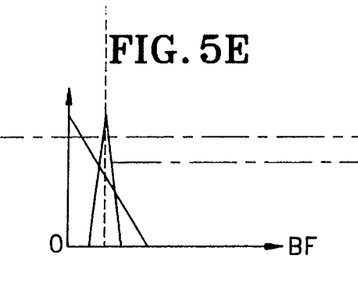
Figure 5F:
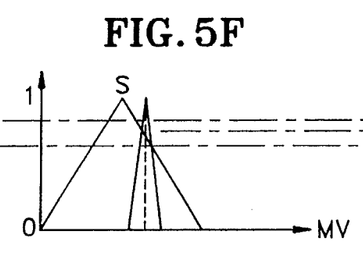
Figure 5G:
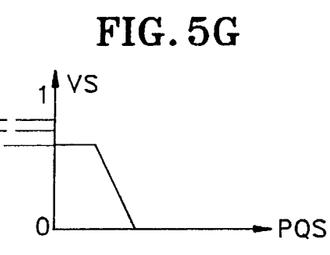
Figure 5H:
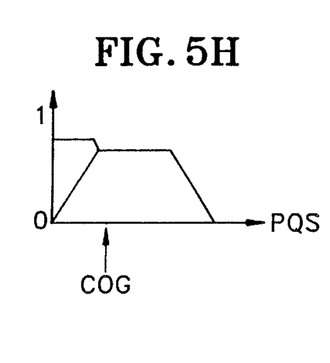

When regulation 4 is applied, if BF has the almost empty (AE) membership function as shown in FIG. 5D, and MV has the small (S) membership function as shown in FIG. 5E, and BF has the empty (E) membership function, then PQS has the very small sized (VS) linguistic truth value as shown in FIG. 5G.

As described in Regulations 3 and 4, the maximum point determined by the points where the triangle of the fuzzified input variable and the membership function meet, is a membership grade determined by a predetermined input variable and by the corresponding linguistic truth value. The membership grade of the membership function corresponding to a quantization step size is determined by the least-wise membership grade among the membership grades determined by the input variable. This kind of reasoning method is called the Mamdani's MAX-MIN method.

In fuzzy reasoner 24, a new membership function (FIG. 5C and FIG. 5G) determined according to the fuzzy control regulations is output to defuzzifier 26.

In defuzzifier 26, the final PQS is determined by using the center of gravity (COG) method which can be expressed as follows.

$$COG = \frac{\Sigma(PQS \times F(PQS))}{\Sigma F(PQS)}$$

Here, F(PQS) is a membership function of the pseudo quantization step size, and PQS is a membership grade of the pseudo quantization step size.

In the COG method for obtaining the centroid of the membership function, the centroid means the location where the area bounded by a membership function and by an axis is divided into two.

When the PQS is determined by the COG method as shown in FIG. 5E, the actual quantization step size (QS) is determined in defuzzifier 26.

Because the quantization step size QS cannot assume values of all the real numbers, the quantization step size nearest to the PQS is selected in defuzzifier 26, and is output to quantizer 12 and buffer 14.

In quantizer 12, the transform coefficients input according to the conventional method are quantized and output.

The fuzzy-controlled coding method according to the present invention can be applied to HD-TV, HD-VCR, digital VCR, digital camcorder, multi-media, video phone and to a video conference system, etc.

In the embodiment of the present invention as described above, a quantization step size determined by the four factors such as FA, BF, MV and BR is determined by a fuzzy control methodology.

However, the scope of the present invention is not limited by the above factors, and any type of system which performs fuzzification reasoning and defuzzification and uses fuzzy control regulations in order to determine a quantization step size is possible to be realized within the scope of the present invention. Further, it is also possible to use only the part of the above four factors.

A fuzzy-controlled coding method and apparatus according to the present invention can suitably adopt itself to the factors of a system even when the factors for determining a quantization step size are different from those preset in the system.

Accordingly, in the present invention, the image quality of the restored image is stably maintained when the quantized image data is restored in a coding system having a high compression rate and is displayed on a screen.

What is claimed is:

1. A fuzzy-controlled coding method for quantizing using a quantization step size determined by at least one factor among the factors of image complexity (FA), buffer fullness, motion vector and picture brightness, said method comprising the steps of:

establishing fuzzy control regulations having at least one input variable selected from among variables corresponding to said factors of image complexity, buffer fullness, motion vector and picture brightness, and having a quantization step size as an output variable thereof;

determining linguistic truth values related to each of said at least one input variable and a first membership function which corresponds to each said linguistic truth values;

calculating a membership grade using the first membership function which corresponds to each of said at least one input variable and to each said linguistic truth values;

generating a second membership function in accordance with a predetermined reasoning operation, using said calculated membership grade, the linguistic truth value used for calculating the membership grade and said established fuzzy control regulations; and determining a quantization step size in accordance with the second membership function, using a predetermined defuzzification operation.

2. The fuzzy-controlled coding method according to claim 1, wherein said step of determining a quantization step size further comprises generating a quantization step size to be actually used as the quantization step size nearest to the membership grade determined by said predetermined defuzzification operation.

3. The fuzzy-controlled coding method according to claim 1, wherein said variables are fuzzified in said step of calculating said membership grade, and the maximum location determined by the points where the respective variables fuzzified by Mamdani's Max-Min method and a respective membership function meet, is determined as a corresponding membership grade, and the least membership grade among the membership grades determined by said variables is selected as a selected membership grade corresponding to linguistic truth value of a predetermined variable.

4. The fuzzy-controlled coding method according to claim 1, wherein, in said step of determining said quantization step size, a quantization step size is calculated from said second membership function using a center of gravity method.

5. A fuzzy-controlled coding method for coding successive image frames which each express at least one image and wherein a quantization step size of predetermined block units of a frame is controlled so as to be quantized and at least one of transferred and recorded, said method comprising:

a local decoding step for detecting a degree of motion between a predetermined block unit of a previous frame and a predetermined block unit of a current frame, and for extracting an estimated block unit wherein the detected degree of motion is compensated;

a quantizing step for converting an estimation error, being the difference between the block unit of the said current frame and a motion compensated estimated unit, into a transform coefficient in the frequency domain, and for quantizing said transform coefficient in accordance with a predetermined quantization step size.

a storing step for storing a motion vector varying in dependance upon the degree of motion detected in said local decoding step and the quantized transform coefficient from said quantizing step and for outputting a value indicative of buffer fullness;

a first detecting step for detecting an image complexity variable with respect to a predetermined block unit of said current frame;

a second detecting step for detecting a picture brightness variable with respect to a predetermined block unit of said current frame; and a fuzzy quantizing control step for fuzzifying input variables respectively representing said detected motion vector, image complexity, picture brightness and buffer fullness, and for determining a quantization step size for said quantizing step by performing a predetermined fuzzy reasoning operation on the fuzzified said input variables, in accordance with a predetermined fuzzy control regulation, and by subsequently performing a predetermined defuzzification operation on the reasoned result.

6. The fuzzy-controlled coding method according to claim 5, wherein said fuzzy quantizing control step comprises the steps of:

establishing fuzzy control regulations having said image complexity (FA), buffer fullness, motion vector and picture brightness as input variables, and a pseudo quantization step size as an output variable;

determining linguistic truth values related to each of said input variables and determining a first membership function corresponding to each said linguistic truth value;

calculating a membership grade using the first membership function corresponding to each input variable and the linguistic truth value;

generating a second membership function in accordance with a Mamdani's Max-Min reasoning method, using said calculated membership grade, the linguistic truth value used for calculating the membership grade and said established fuzzy control regulations;

determining said pseudo quantization step size from said second membership function generated by a fuzzy reasoning operation using a center of gravity (COG) method; and generating a quantization step size to be actually used for a quantizer by selecting, from a range of discrete quantization step sizes, the discrete quantization step size nearest to said determined pseudo quantization step size.

7. A fuzzy-controlled coder having a quantizer for controlling the quantization of an image signal according to a quantization step size determined by at least one among the input variables respectively representing image complexity, buffer fullness, picture brightness and motion vector, said coder comprising:

regulation storage means for storing fuzzy control regulations for determining a quantization step size from said input variables;

fuzzification means for storing linguistic truth values related to each of said input variables and a first membership function corresponding to each said linguistic truth values, and for generating a membership grade and a corresponding linguistic truth value with respect to at least one of said input variables with respect to a predetermined block of an image frame to be quantized;

fuzzy reasoning means for reading the fuzzy control regulations determined by said membership grade and the corresponding linguistic truth value from said regulation storage means, and for generating a second membership function by performing a reasoning operation on said membership grade generated by said fuzzification means and on the corresponding linguistic truth value; and defuzzifier means for defuzzifying the second membership function generated by said fuzzy reasoning means according to a predetermined defuzzifying operation, and thereby generating a quantization step size.

8. The fuzzy-controlled coder according to claim 7, wherein said defuzzifier means generates a nearest quantization step size among a range of the actual quantization step sizes to be used for said quantizer and outputs said nearest quantization step size to said quantizer.

9. The fuzzy-controlled coder according to claim 7, wherein said fuzzification means fuzzifies the input variables input thereto and outputs a membership grade and a corresponding linguistic truth value in accordance with the fuzzified input variables.

10. The fuzzy-controlled coder according to claim 7, wherein said fuzzy reasoning means performs a Mamdani's Max-Min method.

11. The fuzzy-controlled coder according to claim 7, wherein said defuzzifier generates said quantization step size by performing a center of gravity (COG) method.

12. A fuzzy-controlled coder for coding successive image frames each expressing at least one image, wherein a quantization step size is controlled in accordance with predetermined block units of said frame, said coder comprising:

local decoding means for detecting a degree of motion between a predetermined block unit of a previous frame and a predetermined block unit of the current frame, and for extracting therefrom an estimation block wherein the detected degree of motion is compensated;

quantizer means for converting an estimation error being a difference between a block unit of said current frame and the motion compensated estimation block data, into a transform coefficient in the frequency domain, and for quantizing said transform coefficient in accordance with a predetermined quantization step size;

buffer means for storing a motion vector representing the degree of motion detected by said local decoding means, and for storing the quantized output from said quantizer means and for outputting a buffer fullness indication;

a forward analyzer means for detecting image complexity with respect to said predetermined block unit of said current frame;

a luminance analyzer means for detecting picture brightness with respect to said predetermined block unit of said current frame; and a fuzzy bit rate controller for controlling a bit rate of data, and for fuzzifying input variables respectively representing said detected motion vector, image complexity, picture brightness and buffer fullness indication, and for determining a quantization step size of said quantizer means by performing a predetermined fuzzy reasoning operation on said fuzzified input variables in accordance with a predetermined fuzzy control regulation, and by subsequently performing a predetermined defuzzification operation on the reasoned result, and for outputting the defuzzified result of said quantization step size.

13. The fuzzy-controlled coder according to claim 12, wherein said fuzzy bit rate controller comprises:

means for storing fuzzy control regulations which have said image complexity, buffer fullness, motion vector, and picture brightness as input variables, and have a pseudo-quantization step size as an output variable thereof;

fuzzifier means for storing linguistic truth grades related to said each input variable and also storing first membership functions respectively corresponding to said linguistic truth values, for fuzzifying at least one of said input variables with respect to a predetermined block unit of an image frame, and for generating membership grades and the corresponding linguistic truth values thereof in accordance with fuzzified input variable;

fuzzy reasoning means for reading the fuzzy control regulations corresponding to said determined membership grade and the corresponding linguistic truth value, and for generating a second membership function by performing a Mamdani's Max-Min reasoning operation upon the membership grade output from said fuzzifier and on the corresponding linguistic truth value; and defuzzifier means for generating said pseudo-quantization step size by performing a center of gravity determination upon the second membership function and a defuzzification thereof, and for outputting a quantization step size nearest to said pseudo quantization step size to said quantizer means, from among a range of quantization step sizes used by said quantizer means.

* * * * *